US010467300B1

(12) United States Patent
Jastrzebski et al.

(10) Patent No.: US 10,467,300 B1
(45) Date of Patent: Nov. 5, 2019

(54) TOPICAL RESOURCE RECOMMENDATIONS FOR A DISPLAYED RESOURCE

(71) Applicant: Google LLC, Mountain View, CA (US)

(72) Inventors: Michal Jastrzebski, Zurich (CH); Ibrahim Badr, Brookline, MA (US); Gokhan H. Bakir, Zurich (CH); Aneto Okonkwo, Zurich (CH); Marcin M. Nowak-Przygodzki, Zurich (CH)

(73) Assignee: Google LLC, Mountain View, CA (US)

( * ) Notice: Subject to any disclaimer, the term of this patent is extended or adjusted under 35 U.S.C. 154(b) by 335 days.

(21) Appl. No.: 15/388,912

(22) Filed: Dec. 22, 2016

Related U.S. Application Data

(60) Provisional application No. 62/365,030, filed on Jul. 21, 2016.

(51) Int. Cl.
*G06F 16/951* (2019.01)
*G06F 16/2457* (2019.01)

(52) U.S. Cl.
CPC ...... *G06F 16/951* (2019.01); *G06F 16/24578* (2019.01)

(58) Field of Classification Search
CPC ........... G06F 16/9535; G06F 16/24578; G06F 16/248; G06F 16/951; G06F 16/3322; G06F 16/24575
USPC .......................... 707/730, 728, 709, 721, 759
See application file for complete search history.

(56) References Cited

U.S. PATENT DOCUMENTS

| | | | |
|---|---|---|---|
| 7,389,181 B2 | 6/2008 | Meadow | |
| 7,689,613 B2 | 3/2010 | Candelore | |
| 7,788,266 B2 | 8/2010 | Venkataraman | |
| 8,316,019 B1 | 11/2012 | Ainslie et al. | |
| 8,321,406 B2 | 11/2012 | Garg et al. | |
| 8,391,618 B1 | 3/2013 | Chuang | |
| 8,392,435 B1 | 3/2013 | Yamauchi | |
| 8,515,185 B2 | 8/2013 | Lee | |
| 8,521,764 B2 | 8/2013 | Pfleger | |
| 8,606,781 B2 | 12/2013 | Chi et al. | |
| 8,782,071 B1 * | 7/2014 | Mukherjee | G06F 16/9535 707/759 |
| 8,868,540 B2 * | 10/2014 | Ture | G06F 21/6227 707/709 |

(Continued)

OTHER PUBLICATIONS

U.S. Appl. No. 13/069,978, filed Mar. 23, 2011, Taubman et al.

(Continued)

*Primary Examiner* — Dung K Chau
(74) *Attorney, Agent, or Firm* — Fish & Richardson P.C.

(57) ABSTRACT

Methods, systems, and apparatus, including computer programs encoded on a computer storage medium, for providing contextual information to a user. In one aspect, a method includes receiving, from a user device, a query-independent request for contextual information relevant to an active resource displayed in an application environment on the user device, identifying entities from content in the resource, generating queries for topical information based on the entities identified from the content, identifying topical resources that are responsive to the queries for topical information, and providing, to the user device, a user interface element for display with the active resource, wherein the user interface element includes contextual information regarding the identified topical resources.

11 Claims, 4 Drawing Sheets

(56) References Cited

U.S. PATENT DOCUMENTS

| | | | |
|---|---|---|---|
| 8,898,095 | B2 | 11/2014 | Agrawal |
| 9,015,148 | B2* | 4/2015 | White ................. G06F 16/3322 |
| | | | 707/721 |
| 2001/0053968 | A1 | 12/2001 | Galitsky |
| 2005/0060311 | A1* | 3/2005 | Tong .................... G06F 16/951 |
| 2007/0060114 | A1 | 3/2007 | Ramer et al. |
| 2007/0071320 | A1 | 3/2007 | Yada |
| 2007/0140595 | A1 | 6/2007 | Taylor |
| 2007/0214131 | A1 | 9/2007 | Cucerzan |
| 2008/0046405 | A1 | 2/2008 | Olds et al. |
| 2008/0270110 | A1 | 10/2008 | Yurick |
| 2010/0306249 | A1 | 12/2010 | Hill |
| 2011/0035406 | A1 | 2/2011 | Petrou et al. |
| 2011/0038512 | A1 | 2/2011 | Petrou et al. |
| 2011/0125735 | A1 | 5/2011 | Petrou |
| 2011/0128288 | A1 | 6/2011 | Petrou et al. |
| 2011/0131241 | A1 | 6/2011 | Petrou et al. |
| 2011/0137895 | A1 | 6/2011 | Petrou et al. |
| 2012/0109858 | A1 | 5/2012 | Makadia et al. |
| 2012/0191745 | A1 | 7/2012 | Velipasaoglu et al. |
| 2012/0215533 | A1 | 8/2012 | Aravamudan et al. |
| 2013/0055076 | A1* | 2/2013 | Assadollahi ........... G06Q 10/10 |
| | | | 715/256 |
| 2013/0132361 | A1 | 5/2013 | Chen et al. |
| 2013/0218885 | A1* | 8/2013 | Satyanarayanan ... G06Q 30/016 |
| | | | 707/728 |
| 2013/0282709 | A1* | 10/2013 | Zhu ..................... G06F 16/3322 |
| | | | 707/728 |
| 2013/0346400 | A1 | 12/2013 | Ramsey et al. |
| 2014/0046935 | A1 | 2/2014 | Bengio et al. |
| 2014/0172881 | A1 | 6/2014 | Petrou et al. |
| 2015/0058318 | A1 | 2/2015 | Blackwell |
| 2015/0161127 | A1* | 6/2015 | Oates .................. G06F 16/9535 |
| | | | 707/726 |
| 2015/0278366 | A1* | 10/2015 | Pilpel ................. G06F 16/9024 |
| | | | 707/723 |
| 2015/0324454 | A1* | 11/2015 | Roberts ................ G06F 16/338 |
| | | | 707/734 |
| 2017/0371877 | A1* | 12/2017 | Badr .................... G06F 3/0482 |

OTHER PUBLICATIONS

U.S. Appl. No. 13/906,889, filed May 31, 2013, Heiler et al.
U.S. Appl. No. 14/313,519, filed Jun. 24, 2014, Bakir et al.
"10 Mobile Astronomy Apps for Stargazers," [online][Retrieved on Apr. 29, 2014]; Retrieved from the Internet URL: http://mashable.com/2011/06/21/astronomy-mobile-apps/, 13 pages.
"Google announces Search by Image and Voice Search for desktop, revamped mobile search," [online] Jun. 14, 2011 [Retrieved on Mar. 22, 2017] Retrieved from the Internet URL: https://www.engadget.com/2011/06/14/google-announces-search-by-image-search-by-voice-for-desktop/> 1 page.
"Google's Impressive "Conversational Search" Goes Live on Chrome," [online][Retrieved on May 5, 2014]; Retrieved from the Internet URL: http://searchengineland.com/googles-impressive-conversational-search-goes-line-on-chrome-160445, 2013, 12 pages.
Zhang et al., "Probabilistic Query Rewriting for Efficient and Effective Keyword Search on Graph Data," Proceedings of the VLDB Endowment 6(14):1642-1653, 2013, 12 pages.

* cited by examiner

TOPICAL RESOURCE RECOMMENDATIONS FOR A DISPLAYED RESOURCE

CLAIM OF PRIORITY

This application claims priority under 35 USC § 119(e) to U.S. Patent Application Ser. No. 62/365,030, filed on Jul. 21, 2016, the entire contents of which are hereby incorporated by reference.

BACKGROUND

This specification relates to providing contextual information to a user.

A device may provide a user with contextual information. For example, a device may display a web page about a particular subject, receive a search query from the user including search terms for the particular subject, retrieve search results responsive to the search query, and provide the search results to the user.

Typical interaction models require users to provide some form of a user query to a user device. For example, a user may be viewing article about a particular piece of sporting equipment on a smart phone and state "show me reviews about this entity." A search process then analyzes the article, and the query which is dependent on the article, to determine search parameters and execute a search of resources to identify resources that may satisfy the user's informational needs.

SUMMARY

In general, one innovative aspect of the subject matter described in this specification can be embodied in methods that include the actions of receiving, from a user device, a query-independent request for contextual information relevant to an active resource displayed in an application environment on the user device, identifying entities from content in the resource, generating queries for topical information based on the entities identified from the content, identifying topical resources that are responsive to the queries for topical information, and providing, to the user device, a user interface element for display with the active resource, where the user interface element includes contextual information regarding the identified topical resources.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In certain aspects, generating queries for topical information based on the entities identified from the content includes generating a news query. In some aspects, generating queries for topical information based on the entities identified from the content includes generating concatenations of various entities identified from the content in the resource as the queries for topical information.

In some implementations, providing a user interface element for display with the active resource includes determining an importance score for each of the entities identified from content in the resource, determining a topicality score for each of the queries for topical information based on the importance scores, and providing contextual information regarding a particular topical information source based at least on the topicality score for the query that the particular topical information source is identified as responsive. In certain aspects, determining an importance score for each of the entities identified from content in the resource includes determining the importance score for a particular entity based on an appearance of the content in the resource that the particular entity is identified from. In some aspects, determining a topicality score for each of the queries for topical information based on the importance scores includes aggregating the importance scores for the entities that appear in a query as the topicality score for the query. In some implementations, providing contextual information regarding a particular topical information source based at least on the topicality score for the query that the particular topical information source is identified as responsive includes providing contextual information for a predetermined number of topical information sources that are identified in response to queries with topicality scores that reflect higher degrees of topicality.

Particular embodiments of the subject matter described in this specification can be implemented so as to realize one or more of the following advantages. Contextual information that is likely to satisfy a user's informational need may be provided by a device to a user without the user providing a query to the device. The contextual information may be in the form of recommendations of topical resources where the topical resources are responsive to queries that reference entities identified from content in the displayed resource. A topical resource may refer to a resource that includes topical information, and topical information may refer to recently emergent information regarding a current event. The recommended topical resources may include information that satisfies the user's information need. These recommendations may be referred to as topical resource recommendations and may be in the form of navigation links to other topical resources. This results in a convenient way for the user to obtain topical resource recommendations based on a resource displayed on the device.

In particular, the system enables the input of a query-independent request for contextual information that is relevant to an active resource displayed on the user device in a fluid and intuitive manner. The user no longer needs to type in query terms or speak query terms to obtain contextual information. Accordingly, users are more likely to solicit contextual information as doing so can be accomplished in a manner that is not only convenient for the user, but also in a relatively discrete manner so that bystanders are not disturbed by the user speaking into the device. Also, because the user need not type in a query, the user may, in some implementations, solicit the information when the user would otherwise be unable to type effectively, e.g., when the user only has one hand free.

Also, because the input of the query-independent request for contextual information does not require a query input, the system does not need to perform text-to-speech processing or process typing input. This results in fewer input errors and erroneously input queries. Accordingly, when considered in the aggregate, thousands of erroneous and inaccurate queries are avoided, which in turn, provides a more efficient use of search system resources. In other words, multiple erroneous query processing cycles are avoided, which reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
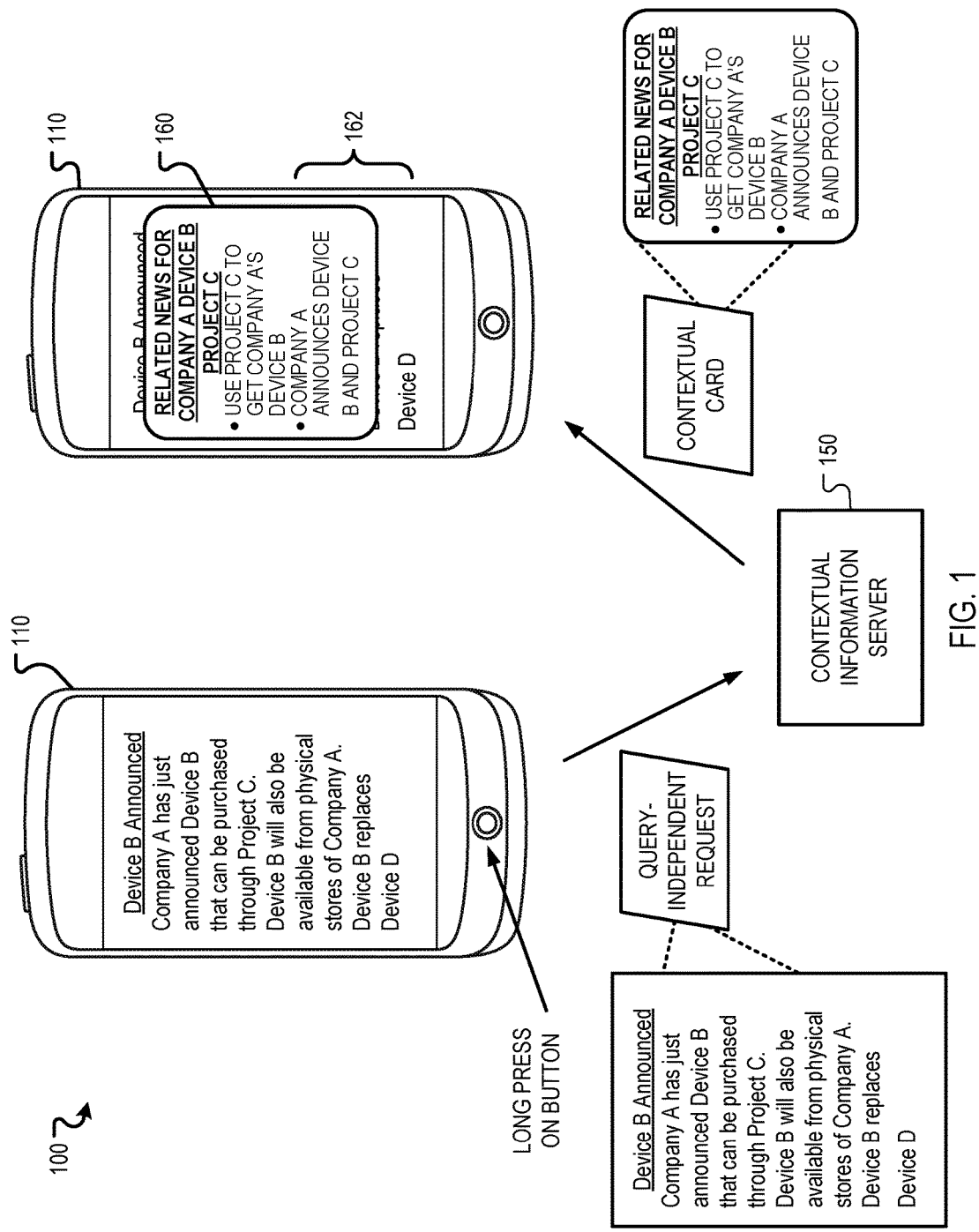
FIG. 1 is a block diagram of an example environment in which contextual information is provided for a displayed resource.

Sometimes a user may desire to receive additional information regarding the subject matter of a resource that the user is currently viewing on a device. For example, a user may be viewing a web page about an announcement for a new product "Device B" by "Company A" released through "Project C" and may desire to obtain additional topical information. The user may open a web page for a search engine, type in "Company A Device B Project C" as a search query for topical information, scroll through a search results listing, and then select a search result to view. However, this process may be time consuming and require multiple interactions by the user.

Described below are systems and methods for providing contextual information for a displayed resource. Instead of providing contextual information based on a query entered by a user, the system may provide contextual information for a displayed resource and independent of a query input. Moreover, the system can provide contextual information in the form of recommendations of topical resources where the topical resources are responsive to queries that reference entities identified from content in the displayed resource. As used in this document, a topical resource is a resource that is of particular relevance to a query or entity due to the resource including information that relates to current events. Examples of topical resources include news articles, reviews, and the like.

To provide the contextual information, the system may detect that a user desires contextual information. For example, a user viewing a webpage announcing "Device B" may press a button for three seconds, or provide some other indication like pressing a dedicated button or performing a particular gesture, to indicate that the user wishes to receive contextual information based on the displayed webpage. The system may detect the indication and, in response, identify entities from the text in the displayed resource, generate various queries that reference the identified entities, identify topical resources that are responsive to the various queries, and provide recommendations of the identified topical resources. For example, the system may identify that the text "Company A," "Device B," and "Project C" that appears in a resource matches with an entity of "Company A," an entity of "Device B," and an entity of "Project C," respectively. In the example, the system may then generate queries of "Company A Device B," "Company A Project C," "Company A Device B Project C" and identify online articles entitled "Use Project C To Get Company A's Device B" and "Company A announces Device B and Project C" that are responsive to the query. Based on the identification, the system provides an interface element that includes navigation links to the identified online articles.

The system may advantageously favor recommending topical resources that are responsive to queries that reference entities that are determined to be more important based on their prominence in the displayed resource. For example, the system may determine a prominence of text in a displayed resource based on one or more of position, color, size, formatting, and recommend topical resources that are responsive to queries that reference multiple entities identified from prominent text. Accordingly, the system may recommend topical resources that are more relevant to what is currently displayed on a device.

These features and additional features are described in more detail below.

FIG. 1 is a block diagram of an example environment 100 in which contextual information is provided for a displayed resource. The environment 100 includes a user device 110 and a contextual information server 150.

A user device 110 is used by a user to obtain contextual information for a displayed resource. The user device 110 is an electronic device that is capable of requesting and receiving resources over the network. Example user devices 110 include personal computers (e.g., desktops or laptops), mobile communication devices (e.g., smart phones or tablets), and other devices that can send and receive data over the network (e.g., televisions, and glasses or watches with network communication functionality). A user device typically includes a user application, e.g., a web browser, to facilitate the sending and receiving of data over the network. The web browser can enable a user to display and interact with text, images, videos, music and other information typically located on a web page at a website on the World Wide Web or a local area network. The user device 110 may use any appropriate application to send and receive data over the network and present requested resources to a user.

A resource is data that includes content that can be visibly rendered by the user device 110. For example, resources may include HTML pages, electronic documents, images files, video files, text message conversations, e-mails, graphical user interfaces of applications, etc. An active resource may be considered a resource that is currently being displayed on the user device 110. Typically, the active resource is rendered by an application that is running in a foreground of a user device.

The user device 110 detects that a user desires contextual information for a displayed resource. For example, the user device 110 may be displaying a resource hosted by a website where the resource includes the text "Device B Announced Company A has just announced Device B that can be purchased through Project C. Device B will also be available from physical stores of Company A. Device B replaces Device D." The user may generate an indication for contextual information, e.g., by pressing a button for three seconds or tapping the screen according to a predefined tap pattern, etc. Assume for illustrative purposes the user performs a long press that indicates that the user desires contextual information for a displayed resource. In response, the user device 110 provides a request to the contextual information server 150 for contextual information for the displayed resource. For example, the user device 110 may provide a request that includes a screenshot of the currently displayed portion of the active resource, where the portion includes the text "San Francisco," or the text of the active resource, the URI of the resources, etc.

The request may be considered a query-independent request as the user device 110 provides the request to the contextual information server 150 without having the user enter terms for a query, whether verbally, physically, or some other interaction. For example, after the user device 110 detects that a user has long pressed a button, the user device 110 may provide the request to the contextual information server 150 without requesting additional information from the user.

In response to providing the request to the contextual information server 150, the user device 110 then receives a user interface element from the contextual information server 150. The user interface element may include navigation links for one or more recommended topical resources identified based on the request. For example, the user device 110 may receive a user interface element that includes the text "Recommended News for Company A Device B Project C" and navigation links for online articles entitled "Use Project C To Get Company A's Device B" and "Company A announces Device B and Project C." The navigation links may be selectable and upon selection, may cause the user device 110 to request the respective resource and then display the resource. The navigation link may be in the form of a title for the resource, a thumbnail of the resource, or some other representation of the resource. In some implementations, the user interface element may display a portion of recommendations. For example, the user interface element may include a carousel of navigation links where only one, two, or some other number of navigation links for recommended topical resources are shown at a time. In another example, the user interface element may include a list of navigation links where only one, two, or some other number of navigation links for recommended topical resources are shown at a time. In other implementations, the user interface element may display all recommendations at once. For example, the user interface element may include a list of all the navigation links.

For the purposes of illustration, the user interface element is described as a card. However, other user interface elements may be used, for example, chat bubbles, selectable linked notes or footnotes, synthesized voice responses, or other forms. In some implementations, instead of a single user interface element that includes multiple navigation links, a user interface element may include a single navigation link and multiple user interface elements may be received for different topical resources.

The user device 110 displays the received contextual card to the user. For example, the user device 110 may generate a graphical panel 160 that is shown overlaid on top of the displayed resource where the graphical panel 160 includes navigation links for recommended topical resources from the card. In another example, the user device 110 may stop displaying the resource and instead display the graphical panel 160. The user device 110 may enable the user to quickly return to the displayed resource. For example, the user device 110 may stop displaying the graphical panel 160 in response to detecting that a user has interacted with, e.g., clicked or touched, a portion of the resource that is not overlaid by the graphical panel 160. In another example, the user device 110 may stop displaying the graphical panel 160 and display the resource in response to detecting that a user has interacted with, e.g., clicked or touched, a selectable option for closing the graphical panel 160.

Figure 2:
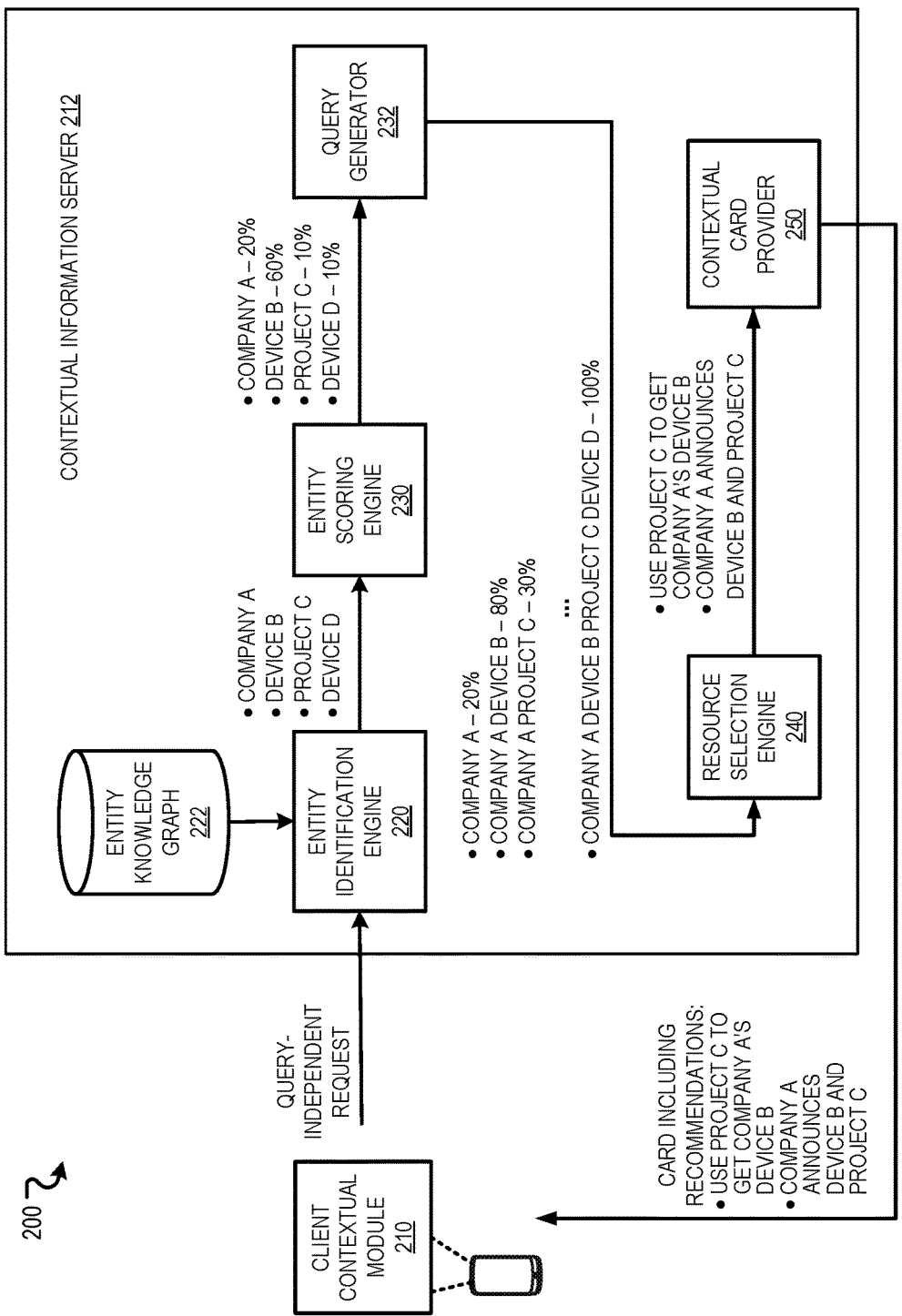
FIG. 2 is a more detailed block diagram of the example environment in which contextual information is provided for a displayed resource.

FIG. 2 is a more detailed block diagram of the example environment 100 in which contextual information is provided for a displayed resource. The environment 100 includes a client contextual module 210 on a user device and a contextual information server 150. The contextual information server 150 includes an entity identification engine 220, an entity scoring engine 230, a query generator 232, a resource selection engine 240, and a contextual card provider 250. In some implementations, the client contextual module 210 may be provided on the user device 110 shown in FIG. 1.

The client contextual module 210 determines that a user desires contextual information for a displayed resource. For example, the client contextual module 210 may determine that a user has rapidly pressed a button three times when viewing a webpage about the announcement of "Device B" by "Company A" under "Project C" (in this example, rapidly pressing the button three times indicates that the user desires contextual information). In response to determining that a user desires contextual information for a displayed resource, the client contextual module 210 generates a request to the contextual information server 150 for contextual information for the displayed resource. For example, the client contextual module 210 may generate a request to the contextual information server 150 for contextual information for the webpage about the announcement of "Device B" by "Company A" under "Project C"

The client contextual module 210 may include information about the displayed resource in the request. For example, the client contextual module 210 may generate a screenshot that is an image showing the webpage and include the screenshot in the request. In another example, the client contextual module 210 by request that the operating system of the user device provide a tree based document object model that defines what is currently being rendered in an application that is in a foreground and include the model in the request. The document object model may define text that appears in the displayed resource and the appearance of the text, e.g., size, color, position, font, or other formatting, of the text. In yet another example the client contextual module 210 may include various handlers, such as text handlers and image handlers, to determine text and image data displayed in the active window of the device and provide the text and image data as part of the request.

In some implementations, the client contextual module 210 may include the information about the displayed resource in the request by determining a source of the displayed resource and including an indication of the source of the request. For example, the client contextual module 210 may determine that displayed resource is provided by a web browser application, in response, determine that the web browser application can provide a uniform resource locator (URL) for the displayed resource, and, in response, include an indication in the request that the source of the active resource is the web browser application and the URL for the displayed resource. Information may additionally or alternatively include metadata describing the displayed resource, a location of the user device, a portion not currently displayed of the resource, or an identity of the user.

For example, the client contextual module 210 may determine that the user device 110 is located in Atlanta and include a location of "Atlanta" in the request.

The client contextual module 210 then provides the request to the entity identification engine 220 without the user entering a query. For example, the client contextual module 210 provides the request to the entity identification engine 220 in response to the user providing the indication that the user desires contextual information for the displayed resource, e.g., three rapid button presses, a long button press, or some other indication, without the user providing any further information, e.g., query terms, after providing the indication.

The entity identification engine 220 receives the request for contextual information for a displayed resource and identifies one or more entities from the content in the displayed resource. For example, the entity identification engine 220 may obtain a request that includes a screenshot of a webpage about the announcement of "Device B" by "Company A" under "Project C" and then identify the entities "Company A," "Device B," "Project C," and "Device D." In another example, the entity identification engine 220 may obtain a request that includes a document object model of the webpage and then identifies "Company A," "Device B," "Project C," and "Device D" as entities. As used in this specification, an "entity" is a concept or thing that can be used by a search system to conduct a search of information. The entity may referred to by a text fragment, e.g., a term or phrase, or a node or an edge in a knowledge graph, and the like.

The entity identification engine 220 may extract text from the request. For example, the entity identification engine 220 may extract the text "Device B Announced Company A has just announced Device B that can be purchased through Project C. Device B will also be available from physical stores of Company A. Device B replaces Device D" from the request. The entity identification engine 220 may extract the text by performing image processing on the request. For example, the entity identification engine 220 may obtain a screenshot in the request and perform optical character recognition to identify the text displayed on the client device. The entity identification engine 220 may additionally or alternatively extract text by parsing a document object model included in the request. In some implementations, the entity identification engine 220 may identify the one or more entities from the extracted text based on natural language processing. Similarly, the entity identification engine 220 may also account of spelling, grammatical, or optical character recognition mistakes in identifying entities.

The entity identification engine 220 identifies the one or more entities from the extracted text using the entity knowledge graph 222. For example, the entity identification engine 220 may identify that the text "Company A" in the webpage matches the name of an entity "Company A" in the entity knowledge graph 222 and the text "Device B" in the webpage matches the name of the entity "Device B" in the entity knowledge graph 222. The entity knowledge graph 222 may be a knowledge graph that includes nodes for entities, edges that indicate relationships between the nodes, and contextual information describing the entities represented by the nodes. In a particular implementation, the entity identification engine may take a displayed resource D and extract all names, places, events, etc. as a set P=(p_1, p_2, . . . } where p_1, p_2, etc. refer to different entities identified from content in the displayed resource D.

The entity scoring engine 230 may receive indications of entities identified by the entity identification engine 220 and determine an importance score for each of the identified entities. For example, the entity scoring engine 230 may indications that the entities "Company A," "Device B," "Project C," and "Device D" are identified from content in the displayed resource and, in response, determine an importance score of 20% for "Company A," 60% for "Device B," 10% for "Project C," "and 10% for "Device D."

An importance score for an entity may reflect a confidence that the entity is important in satisfying a user's informational need. For example, an entity score of 10% may reflect a low confidence that providing topical resources regarding the entity is important to satisfying a user's informational need and an entity score of 90% may reflect a high confidence that providing topical resources regarding the entity is important to satisfying a user's informational need. Alternatively, an importance score for each entity may be simply be a value that indicates an importance of the entity relative to the importance of other entities, and need not represent a confidence that topical resources regarding the entity will satisfy a user's informational need. Other appropriate metrics of importance for an entity may also be used for importance scores.

The entity scoring engine 230 may determine the importance score for an entity based on a prominence of content from which the entity is identified. For example, the entity scoring engine 230 may determine importance scores that reflect a greater confidence for entities identified from terms that appear more frequently in a displayed resource. In a particular example, the entity scoring engine 230 may determine that the term "Company A" is currently displayed twice, the term "Device B" is currently displayed six times," the term "Project C" is currently displayed once, and the term "Device D" is displayed once and, in response, determine an importance score for each entity that is 10% multiplied by the number of terms that reference to the entity appears, e.g., determine importance score of 20% for "Company A," 60% for "Device B," 10% for "Project C," "and 10% for "Device D." The entity identification engine 220 may determine a prominence of content based on one or more of size, color, font, position, or other formatting of text determined based on a screenshot or a document object model.

In another example, the entity scoring engine 230 may determine importance scores that reflect a higher degree of confidence for entities identified from text that is centered as that text may be centered because the text is important. In still another example, the entity scoring engine 230 may determine importance scores that reflect a higher degree of confidence for entities identified from text that is bolded as the text may be bolded because the text is important. In yet another example, the entity scoring engine 230 may determine entity scores that reflect a higher degree of confidence for entities identified from text that is a larger size, a different color, or aligned differently from the majority of displayed text because different appearance of the text may indicate that the text is important. In a particular example, the entity identification engine 220 may parse the model to determine that the text "Device B" is underlined and displayed at the top of a screen above the remaining text which is not underlined and accordingly, determine an importance score that reflects a greater degree of confidence for the entity "Device B" identified from that text than for entities identified from text that is not underlined.

In some implementations, the entity scoring engine 230 may determine importance scores for entities identified from text based search query logs. For example, the entity scoring engine 230 may determine importance scores that reflect a higher degree of confidence for entities that are referenced more frequently by search queries that search query logs indicate as having been submitted less than a day, a week, a month, or some other length of time.

In some implementations, the entity scoring engine 230 may determine importance scores based on additional information in the request. For example, the entity scoring engine 230 may determine that the request indicates that user device 110 is in Atlanta, e.g., based on geo-location data associated with the request or the user device and, in response, determine importance scores that reflect a greater confidence for entities located in Atlanta. In another example, the entity scoring engine 230 may determine that the request indicates that the request is from "User A" and, in response, determine importance scores that reflect a higher degree of confidence for entities for which "User A" has received information for during the last hour, day, week, month, or some other period of time.

In a particular implementation, the entity scoring engine 230 may take a set $P=(p\_1, p\_2, \ldots)$ where $p\_1, p\_2$, etc. refer to different entities identified from content in the displayed resource D, and for each element in P, define a function $T(p, D)$ that assigns an importance score to the entity. The output after assigning an importance to score to each element in P may be the set $T=\{(p\_1, t\_1), (p\_2, t\_2), \ldots\}$ where $t\_i$ refers to an importance score for entity $p\_i$.

The query generator 232 may receive indications of entities identified by the entity identification engine 220 and labeled with importance scores determined by the entity scoring engine 230 and generate queries labeled with topicality scores based on the importance scores. For example, the query generator 232 may receive an indication of the entity "Company A" labeled with the importance score of 20%, the entity "Device B" labeled with the importance score of 60%, the entity "Project C" labeled with the importance score of 10%, and the entity "Device D" labeled with the importance score of 10% and, in response, generate a query "Company A" labeled with a topicality score of 20%, "Company A Device B" labeled with a topicality score of 80%, "Company A Project C" labeled with a topicality score of 30%, "Company A Device B Project C Device D" labeled with a topicality score of 100%, and additional queries for the various other concatenations of terms referencing the identified entities. The queries may be queries for topical information and may be news queries that identify news articles that are responsive to terms in the news queries.

A topicality score for query may reflect a confidence that the query is topical in satisfying a user's informational need. For example, a topicality score of 10% may reflect a low confidence that providing topical resources responsive to a query will satisfy a user's informational need and a topicality score of 90% may reflect a high confidence that providing topical resources responsive to a query will satisfy a user's informational need. Alternatively a topicality score for each query may be simply be a value that indicates a topicality of the query relative to the topicality of other queries, and need not represent a confidence that topical resources responsive to the query will satisfy a user's informational need. Other appropriate metrics of topicality for a query may also be used for topicality scores.

The query generator 232 may generate queries by aggregating terms representing entities identified from the displayed resource in various combinations and aggregating importance scores for the entities into a topicality score. For example, the query generator 232 may select the entity "Company A" and the entity "Project C," concatenate the names of the entities to generate the query "Company A Project C," and label the query with a topicality score of 30% from summing the respective importance scores of 20% and 10% corresponding to the selected entities.

In some implementations, the query generator 232 may use natural language grammar rules to generate the queries. The query generator 232 may generate queries with terms with different tenses or pluralities than terms in the displayed resource. Other appropriate query generation techniques may also be used.

The resource selection engine 240 may receive queries labeled with topicality scores and select one or more topical resources responsive to the queries. For example, the resource selection engine 240 may receive the query "Company A" labeled with a topicality score of 20%, "Company A Device B" labeled with a topicality score of 80%, "Company A Project C" labeled with a topicality score of 30%, "Company A Device B Project C Device D" labeled with a topicality score of 100%, and additional queries for the various other concatenations of terms referencing the identified entities, and, in response, select online articles entitled "Use Project C To Get Company A's Device B" and "Company A announces Device B and Project C" responsive to the query "Company A Device B Project C."

The resource selection engine 240 may select the topical resources based on identifying resources that are responsive to the queries and selecting topical resources based at least on the topicality scores of the queries from which the resources are identified. For example, the resource selection engine 240 may determine that no topical resources other than the displayed resource are responsive to the query "Company A Device B Project C Device D" labeled with the topicality score of 100% that reflects a greatest confidence out of all the queries, the online articles entitled "Use Project C To Get Company A's Device B" and "Company A announces Device B and Project C" responsive to the query "Company A Device B Project C" labeled with a topicality score of 60%, and that multiple topical resources are responsive to the query "Company A" labeled with a topicality score of 20% and, in response, select the two online articles as they are topical resources that are responsive to the query labeled with a topicality score that reflects the greatest degree of confidence.

In some implementations, the resource selection engine 240 may select the topical resources based on a maximum number. For example, the resource selection engine 240 may select a maximum of two, four, ten, or some other number of topical resources that are responsive to queries labeled with topicality scores that reflect the greatest degree of confidence.

In some implementations, the resource selection engine 240 may determine a relevance score for pairs of topical resources and queries, and select topical resources based on a combination of the relevance scores and topicality scores. The relevance score for a particular topical resource and a particular query may reflect a confidence that the topical resource is relevant to the particular query. For example, the resource selection engine 240 may, for each topical resource, multiply a relevance score for the topical resource by the topicality score of the query that the topical resource is responsive, and then select the topical resources with the highest products. In another example, the resource selection engine 240 may, for each topical resource, sum a relevance score for the topical resource and the topicality score of the query that the topical resources is responsive, and then select the topical resources with the highest sum.

In some implementations, the resource selection engine 240 may select topical resources based on a combination of user engagement with the topical resource and topicality scores. User engagement of a particular topical resource may reflect a measure of user interaction with the particular topical resource. A user engagement that reflects a greater measure of user interaction for topical resources that are indicated by search logs and requested more frequently. For example, the resource selection engine 240 may, for each topical resource, multiply user engagement of the topical resource with the topicality score of the query that the topical resource is responsive, and select the topical resources with the highest products. In some implementations, the logs may include one or more of search query logs that indicate resources that are requested using navigation links provided in search results page or application logs that indicate requests for resources that are provided by the applications, e.g., a web browser application, a video playing application, or some other application.

In a particular implementations, the resource selection engine 240 may obtain set F={(pc_1, tc_1), (pc_2, tc_2), . . . } where pc_i represents a combination of entities and tc_i represents a respectively topicality score for the combination pc_i and, in response, retrieve set E={ (pc_1, tc_1, d1_1), . . . , (pc_1, tc_1, d_1_n), (pc_2, tc_2, d_2_1), (pc_2, tc_2, d_2_n), . . . } where d_i_n are n topical resources that are responsive to the combination pc_i. The resource selection engine 240 may then select a predetermined number, e.g., ten, five, two, or some other number, of the topical resources that are responsive to combinations that are labeled with topicality scores that reflect greatest degrees of confidence.

The contextual card provider 250 may obtain indications of selected topical resources and provide a contextual card that includes navigation links to the selected topical resources to the client contextual module 210. Thus, in response to providing the request to the entity identification engine 220, the client contextual module 210 receives a contextual card and renders the contextual card. For example, the client contextual module 210 receives a contextual card that includes navigation links to online articles entitled "Use Project C To Get Company A's Device B" and "Company A announces Device B and Project C" and text "Related News for Company A Device B Project C," and displays the contextual card along with the active displayed resource.

In particular, the contextual card provider 250 may obtain an identification of online articles entitled "Use Project C To Get Company A's Device B" and "Company A announces Device B and Project C" identified from the query "Company A Device B Project C" and, in response, generate a contextual card that includes navigation links to the online articles entitled "Use Project C To Get Company A's Device B" and "Company A announces Device B and Project C" and text "Related News for Company A Device B Project C," and provide the contextual card to the client contextual module 210.

Figure 3:
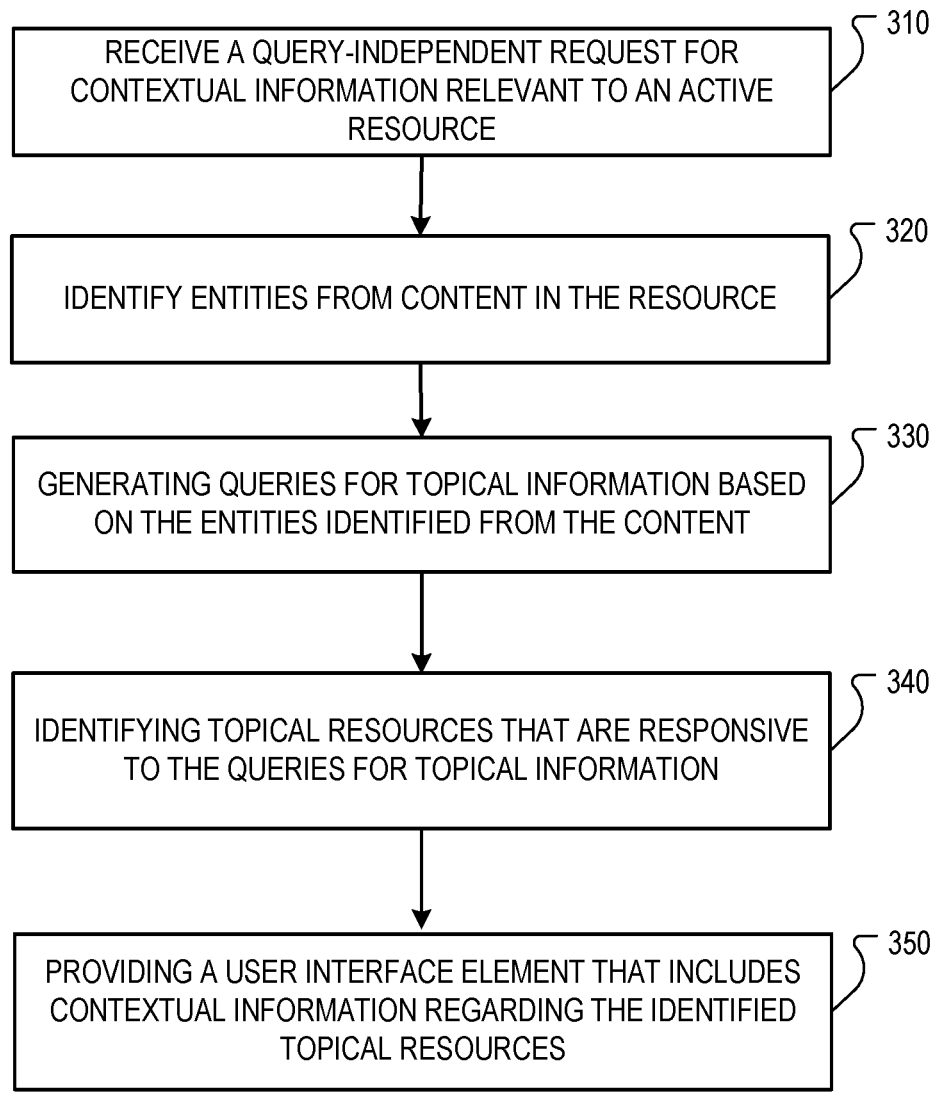
FIG. 3 is a flow diagram of an example process for providing contextual information for a displayed resource.

FIG. 3 is a flow diagram of a process 300 for providing contextual information for a displayed resource. For example, the process 300 can be used by the contextual information server 150 from the environment 100.

The process 300 includes receiving a query-independent request for contextual information relevant to an active resource (310). For example, the entity identification engine 220 may receive a request that includes a document object model that defines that the text "Device B Announced" is underlined, centered, and displayed above the text "Company A has just announced Device B that can be purchased through Project C. Device B will also be available from physical stores of Company A. Device B replaces Device D" that is not underlined and aligned to the left. In another example, the entity identification engine 220 may receive a request that includes a screenshot of a webpage being displayed on a user device.

The process 300 includes identifying entities from content in the resource (320). For example, the entity identification engine 220 may identify the entities "Company A," "Device B," "Project C," and "Device D" from respective text that a document object model in a request indicates is being displayed on the user device.

The process 300 includes generating queries for topical information based on the entities identified from the content (330). For example, the query generator 232 may generate queries for topical information based on generating various combinations of names of entities "Company A," "Device B," "Project C," and "Device D" identified from content in the resource. In some implementations, the entity scoring engine 230 may determine importance scores for entities identified from the content of the displayed resource and the query generator 232 may label the queries with topicality scores determined based on the importance scores for the entities referenced by the queries.

The process 300 includes identifying topical resources that are responsive to the queries for topical information (340). For example, the resource selection engine 240 may determine that online articles entitled "Use Project C To Get Company A's Device B" and "Company A announces Device B and Project C" are responsive to the query "Company A Device B Project C." In some implementations, the entity scoring engine 230 may identify the topical resources that are responsive to queries labeled with topicality scores that reflect a greatest degree of topicality out of all the queries.

The process 300 includes providing a user interface element that includes contextual information regarding the identified topical resource (350). For example, the contextual card provider 250 may generate a contextual card that includes navigation links to the online articles entitled "Use Project C To Get Company A's Device B" and "Company A announces Device B and Project C" and "Related News for Company A Device B Project C," and provide the contextual card to the client contextual module 210.

In some implementations, the process 300 can include additional steps, fewer steps, or some of the steps can be divided into multiple steps. For example, the contextual information server 150 may filter out identified entities that have importance scores below an importance threshold and the query generator 232 may generate queries from the remaining identified entities. In another example, resource selection engine 240 may identify topical resources by first using queries with topicality scores reflecting a higher degree of topicality and use queries in a descending order of topicality score until a sufficient number of topical resources are identified and then generate a contextual card using those topical resources.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

Figure 4:
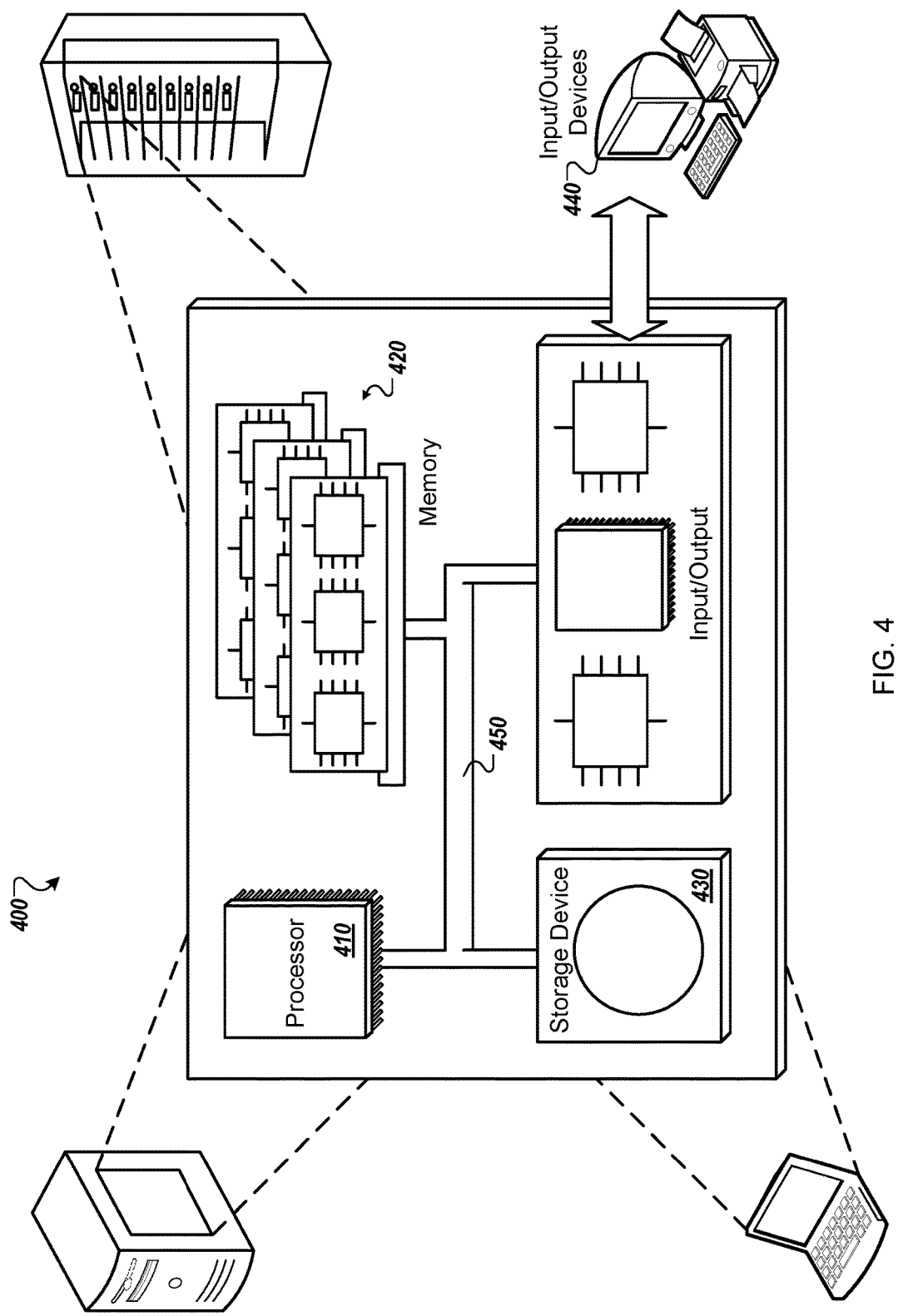
FIG. 4 is a schematic diagram of a computer system.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, the method comprising:

receiving, from a user device, a query-independent request for contextual information relevant to an active resource displayed in an application environment on the user device;

identifying entities from content in the active resource and terms representing the entities identified from the content;

determining a respective importance score for each of the entities;

generating queries for topical information based on the entities identified from the content in the active resource, wherein generating a particular query of the queries based on the entities comprises:

selecting one or more entities of the entities identified from the content in the active resource;

aggregating terms representing the selected entities identified from the content in the active resource to form the particular query; and assigning a topicality score for the particular query by aggregating the importance scores of the selected entities;

for each of the queries, identifying topical resources that are responsive to the queries for topical information;

selecting a proper subset of the topical resources responsive to the queries based on the topicality scores for the respective queries; and providing, to the user device, a user interface element for display with the active resource, wherein the user interface element includes contextual information regarding the selected proper subset of topical resources.

2. The method of claim 1, wherein generating queries for topical information based on the entities identified from the content comprises:
generating a news query.

3. The method of claim 1, wherein determining an importance score for each of the entities identified from content in the resource comprises:
determining the importance score for a particular entity based on an appearance of the content in the resource that the particular entity is identified from.

4. The method of claim 1, wherein providing contextual information regarding a particular topical information source based at least on the topicality score for the query that the particular topical information source is identified as responsive comprises:
providing contextual information for a predetermined number of topical information sources that are identified in response to queries with topicality scores that reflect higher degrees of topicality.

5. A system comprising:
a data processing apparatus; and
a non-transitory computer readable storage medium in data communication with the data processing apparatus and storing instructions executable by the data processing apparatus and upon such execution cause the data processing apparatus to perform operations comprising:
receiving, from a user device, a query-independent request for contextual information relevant to an active resource displayed in an application environment on the user device;
identifying entities from content in the active resource and terms representing the entities identified from the content;
determining a respective importance score for each of the entities;
generating queries for topical information based on the entities identified from the content in the active resource, wherein generating a particular query of the queries based on the entities comprises:
selecting one or more entities of the entities identified from the content in the active resource;
aggregating terms representing the selected entities identified from the content in the active resource to form the particular query; and
assigning a topicality score for the particular query by aggregating the importance scores of the selected entities;
for each of the queries, identifying topical resources that are responsive to the queries for topical information;
selecting a proper subset of the topical resources responsive to the queries based on the topicality scores for the respective queries; and
providing, to the user device, a user interface element for display with the active resource, wherein the user interface element includes contextual information regarding the selected proper subset of topical resources.

6. The system of claim 5, wherein generating queries for topical information based on the entities identified from the content comprises:
generating a news query.

7. The system of claim 5, wherein determining an importance score for each of the entities identified from content in the resource comprises:
determining the importance score for a particular entity based on an appearance of the content in the resource that the particular entity is identified from.

8. The system of claim 5, wherein providing contextual information regarding a particular topical information source based at least on the topicality score for the query that the particular topical information source is identified as responsive comprises:
providing contextual information for a predetermined number of topical information sources that are identified in response to queries with topicality scores that reflect higher degrees of topicality.

9. A non-transitory computer readable storage medium storing instructions executable by a data processing apparatus and upon such execution cause the data processing apparatus to perform operations comprising:
receiving, from a user device, a query-independent request for contextual information relevant to an active resource displayed in an application environment on the user device;
identifying entities from content in the active resource and terms representing the entities identified from the content;
determining a respective importance score for each of the entities;
generating queries for topical information based on the entities identified from the content in the active resource, wherein generating a particular query of the queries based on the entities comprises:
selecting one or more entities of the entities identified from the content in the active resource;
aggregating terms representing the selected entities identified from the content in the active resource to form the particular query; and
assigning a topicality score for the particular query by aggregating the importance scores of the selected entities;
for each of the queries, identifying topical resources that are responsive to the queries for topical information;
selecting a proper subset of the topical resources responsive to the queries based on the topicality scores for the respective queries; and
providing, to the user device, a user interface element for display with the active resource, wherein the user interface element includes contextual information regarding the selected proper subset of topical resources.

10. The medium of claim 9, wherein generating queries for topical information based on the entities identified from the content comprises:
generating a news query.

11. The medium of claim 9, wherein determining an importance score for each of the entities identified from content in the resource comprises:
determining the importance score for a particular entity based on an appearance of the content in the resource that the particular entity is identified from.

* * * * *

UNITED STATES PATENT AND TRADEMARK OFFICE
CERTIFICATE OF CORRECTION

| | | |
|---|---|---|
| PATENT NO. | : 10,467,300 B1 | Page 1 of 1 |
| APPLICATION NO. | : 15/388912 | |
| DATED | : November 5, 2019 | |
| INVENTOR(S) | : Jastrzebski et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 403 days.

Signed and Sealed this
Fourteenth Day of July, 2020

Andrei Iancu
*Director of the United States Patent and Trademark Office*